UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

PROCESS FOR SEPARATING SALTS FROM A MIXTURE OF SALTS IN SOLUTION.

1,288,593.    Specification of Letters Patent.    Patented Dec. 24, 1918.

No Drawing.    Application filed April 17, 1915.    Serial No. 22,107.

*To all whom it may concern:*

Be it known that I, JOHN W. HORNSEY, a citizen of the United States, and a resident of Summit, Union county, New Jersey, have invented certain new and useful Improvements in Processes for Separating Salts from a Mixture of Salts in Solution, of which the following is a specification.

I have found that in the case of certain waters which contain sodium chlorid (NaCl), sodium sulfate ($Na_2SO_4$), sodium monocarbonate ($Na_2CO_3$), sodium bicarbonate ($NaHCO_3$), borax (sodium tetra borate, $Na_2B_4O_7$—$10H_2O$), and potassium chlorid (KCl), that the solubilities of certain of these salts are so similar as to render the unaided process of fractional crystallization very difficult, if not commercially impossible.

I consequently combine various steps of fractional crystallization and chemical reaction so as to comprise a complete and simple process of separation.

The following is a typical manner of applying my invention:

With a brine containing compounds of approximately the following percentages:

| | |
|---|---|
| Borax, $Na_2B_4O_7$ | 1.55 |
| Sodium bicarbonate, $NaHCO_3$ | .25 |
| Sodium monocarbonate, $Na_2CO_3$ | 4.76 |
| Sodium chlorid, NaCl | 15.84 |
| Sodium sulfate, $Na_2SO_4$ | 6.72 |
| Potassium chlorid, KCl | 4.36 |
| Comprising a total of | 33.48% |

I first bring the solution containing the salts into contact with carbon dioxid ($CO_2$), which may be continuously utilized, and, as will be subsequently described, is recovered so that there is as little waste as possible. The carbon dioxid is brought into contact with the brine in any suitable apparatus and is absorbed by the sodium carbonate, so that the major portion of the sodium monocarbonate is transformed into the bicarbonate, which, being comparatively insoluble, particularly in a solution of the other salts, is filtered out or separated from the brine in any suitable manner. I then preferably calcine this bicarbonate, thus reconverting it into the monocarbonate (soda ash). The calcination being effected in a closed receptacle, I am enabled to recover carbon dioxid, which is then utilized to carbonate subsequent amounts of brine. This carbonating operation reduces the percentage of sodium carbonate in the brine to such an extent that the other salts may be crystallized from the brine by evaporation of the water before the remaining carbonates are precipitated.

I next evaporate a sufficient amount of water from the brine to bring about the crystallization of the particular salt which tends to come out of the solution next, in this case, sodium chlorid, and continue this evaporation until I have reduced the volume of the brine to the point where appreciable amounts of other salts tend to crystallize out with the product that it is desired to produce. This product is separated from the brine by filtration, or in any suitable manner.

I next cool the filtrate, which in this particular instance, causes a considerable precipitation of borax and potassium chlorid with a small percentage of other salts. This precipitate is then separated from the brine in any suitable manner. The borax and potassium chlorid thus precipitated are then dissolved with hot water to form a dilute solution, and brought into the cycle of operation, as will be hereinafter described.

If the percentage of carbonate is objectionably high, the filtrate may next be brought into intimate contact with carbon dioxid, as in the initial step of the process, and a major portion of the remaining carbonates is thereby removed.

A sufficient amount of water is then evaporated from the filtrate to bring about the crystallization of the next salt which tends to come out at this point. I have found it advisable to carry the evaporation to the point where the product so formed shall consist essentially of sodium sulfate and sodium chlorid. These compounds, if desired, may be separated, and the separation may be brought about by redissolving to a saturated solution at a temperature of about 33° C. or higher, and cooling, which causes the precipitation of the sodium sulfate, leaving sodium chlorid in solution. This latter, if desired can be recovered by evaporation.

The salts remaining in solution in the filtrate consist principally of borax and potassium chlorid, and to separate these compounds I proceed in the following manner:

I first dilute the filtrate, which is preferably at a temperature of approximately 200° F. with water of the same temperature, until a fairly dilute solution results, having a specific gravity of from 1.12 to 1.22 at that temperature. I then add the dilute solution of the same density and temperature of borax and potassium chlorid described in a preceding step. I then cool this diluted brine to a temperature of about 40° F., at which temperature part of the borax is precipitated, and when separated from the solution and washed or cleansed in the usual manner, is of a marketable degree of purity. The water is then evaporated from the solution by heating, to bring it substantially to the point of saturation; that is, to the point at which the crystals begin to form at a temperature near boiling, which may be used for evaporation. I then cool the saturated solution to about 40° F., at which temperature potassium chlorid of a marketable purity is crystallized from the solution. If it is desired to obtain a further amount of borax or of potassium chlorid, or of either, from the filtrate, the filtrate may be again passed through the same cycle, or it may be mixed with other brine at a point in the process which may best be determined by an analysis of the brine—generally at the point at which the brine is diluted to take out the borax. In this way practically all waste is eliminated.

It is to be understood that I do not claim in this application the specific steps for the separation of borax and potassium chlorid alone from solutions containing such compounds, as such processes are claimed in co-pending applications of mine, Serial Nos. 22,105 and 22,106, filed April 17, 1915.

In this manner it will be clear that there is no appreciable waste in my process, and that the final separation of the various salts composing the mixture is substantially complete and effective.

It is to be understood that my process is not limited to utilizing the various temperatures and specific gravities above mentioned, as they may be varied within comparatively wide ranges.

The terms and expressions which I have employed are used as terms of description and not of limitation, and I have no intention, in the use of such terms and expressions, of excluding any step which may be an equivalent of any of the features which I have described, but recognize that various modifications, such, for instance, as the interposition of a cooling step after the second evaporation, thus precipitating a second mixed crop of borax and potassium chlorid—are possible within the scope of the invention claimed.

What I claim is:

1. The herein described process of separating sodium and potassium salts in solution containing sodium carbonate, sodium chlorid, borax, potassium chlorid, and sodium sulfate, which consists in treating the solution with carbon dioxid to eliminate sodium monocarbonate, then evaporating at an elevated temperature to remove sodium chlorid, and cooling to reduce the percentage of borax and potassium chlorid, then evaporating at an elevated temperature to remove sodium sulfate and sodium chlorid, diluting the hot filtrate to a specific gravity of from 1.12 to 1.22 at about 200° F. and cooling to remove borax, and concentrating and cooling to remove potassium chlorid.

2. The herein described process of separating sodium and potassium salts in solution containing sodium carbonate, sodium chlorid, borax, potassium chlorid, and sodium sulfate, which consists in treating the solution with carbon dioxid to eliminate sodium monocarbonate, then evaporating to remove sodium chlorid, and cooling to reduce the percentage of borax and potassium chlorid, recarbonating to substantially remove the balance of the carbonates, then evaporating to remove sodium sulfate and chlorid, adding the above-mentioned borax and potassium chlorid in the form of a hot, dilute solution to the filtrate to produce a solution having a specific gravity of from 1.12 to 1.22 at 200° F., and cooling to remove borax, concentrating and cooling to remove potassium chlorid, returning the filtrate from the potassium chlorid to the cycle.

3. The herein described process of separating sodium and potassium salts in solution containing sodium carbonate, sodium chlorid, borax, potassium chlorid, and sodium sulfate, which consists in treating the solution with carbon dioxid to eliminate sodium monocarbonate, then evaporating to remove sodium chlorid and cooling to remove borax and potassium chlorid, dissolving the borax and potassium chlorid above obtained in the form of a hot dilute solution having a specific gravity of from 1.12 to 1.22 at a temperature of about 200° F., and cooling to remove the borax, and concentrating and cooling to remove potassium chlorid.

JOHN W. HORNSEY.